(12) United States Patent
Heppenstall et al.

(10) Patent No.: US 7,300,583 B1
(45) Date of Patent: Nov. 27, 2007

(54) APPARATUS AND METHOD FOR REMEDIATION OF A WASTE STREAM

(75) Inventors: Richard Joseph Heppenstall, Worcester, MA (US); Richard James Heppenstall, San Francisco, CA (US)

(73) Assignee: ABCUSA Environmental Holdings, Inc., Worcester, MA (US)

( * ) Notice: Subject to any disclaimer, the term of this patent is extended or adjusted under 35 U.S.C. 154(b) by 0 days.

(21) Appl. No.: 11/523,451

(22) Filed: Sep. 19, 2006

(51) Int. Cl.
    *C02F 3/00* (2006.01)
(52) U.S. Cl. .................. 210/606; 210/610; 210/611; 210/749; 210/205; 210/206; 210/207; 210/209
(58) Field of Classification Search ........ 210/205–207, 210/209, 606, 610, 611, 749
    See application file for complete search history.

(56) References Cited

U.S. PATENT DOCUMENTS

| | | | |
|---|---|---|---|
| 4,375,535 A | 3/1983 | Kightlinger et al. | |
| 4,497,930 A | 2/1985 | Yamasaki et al. | |
| 4,517,316 A * | 5/1985 | Mason | 521/81 |
| 4,535,061 A | 8/1985 | Chakrabarty et al. | |
| 4,670,149 A * | 6/1987 | Francis | 210/608 |
| 4,810,385 A | 3/1989 | Hater et al. | |
| 4,940,539 A * | 7/1990 | Weber | 210/149 |
| 5,225,083 A | 7/1993 | Pappas et al. | |
| 5,271,829 A * | 12/1993 | Heppenstall | 210/127 |
| 5,569,634 A | 10/1996 | Miller et al. | |
| 5,578,474 A | 11/1996 | Focht et al. | |
| 5,840,182 A | 11/1998 | Lucido et al. | |
| 5,925,252 A | 7/1999 | Cline | |
| 5,939,086 A | 8/1999 | Levy | |
| 6,096,530 A | 8/2000 | Kato et al. | |
| 6,152,331 A | 11/2000 | Clement | |
| 6,194,197 B1 | 2/2001 | Hyman et al. | |
| 6,197,321 B1 | 3/2001 | Richter et al. | |
| 6,346,262 B1 | 2/2002 | Levy | |
| 6,350,461 B1 | 2/2002 | Levy | |
| 6,402,941 B1 | 6/2002 | Lucido et al. | |
| 6,699,701 B1 | 3/2004 | Sulakvelidze et al. | |

\* cited by examiner

*Primary Examiner*—Chester T. Barry
(74) *Attorney, Agent, or Firm*—G.L. Loomis & Associates, Inc.; Gary L. Loomis

(57) ABSTRACT

The present invention provides a dispensing apparatus and method for the delivery of remediation agents into waste systems wherein the apparatus is capable of generating and maintaining a controlled release of concentrated a remediation composition throughout the delivery cycle. The invention also provides a dispensing apparatus and methods wherein the remediation agent is a remediation agent that includes living organisms. Finally, the invention provides a dispensing apparatus and methods wherein compositions of remediation agents are conveniently formulated for specific applications providing a range of retention, activation and release profiles that optimize the remediation effectiveness.

40 Claims, 10 Drawing Sheets

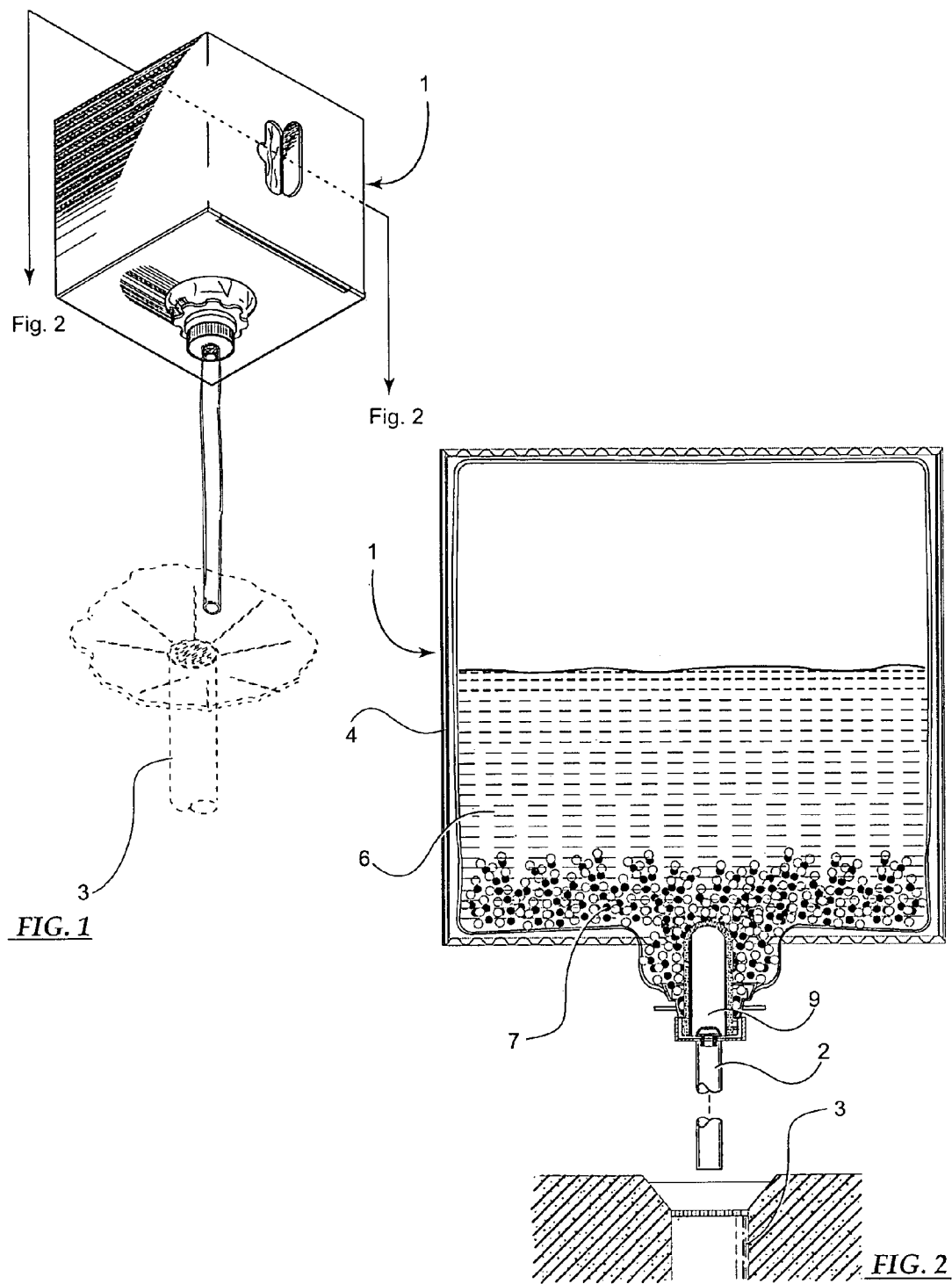

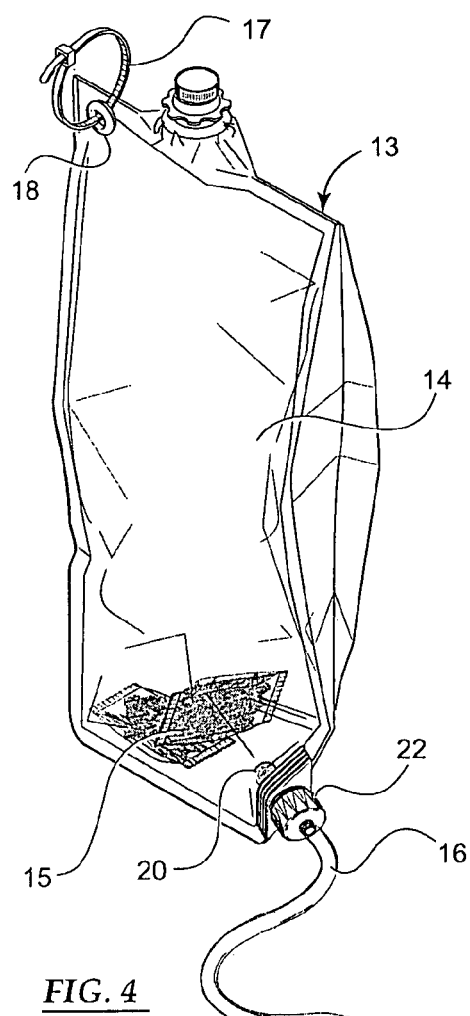
FIG. 4
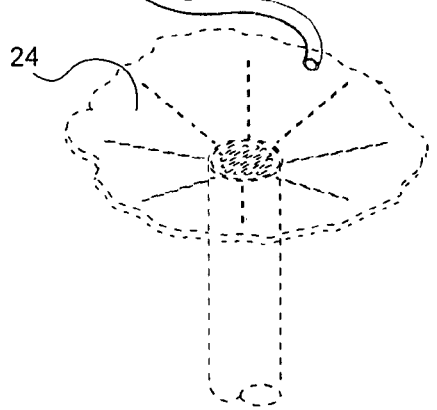
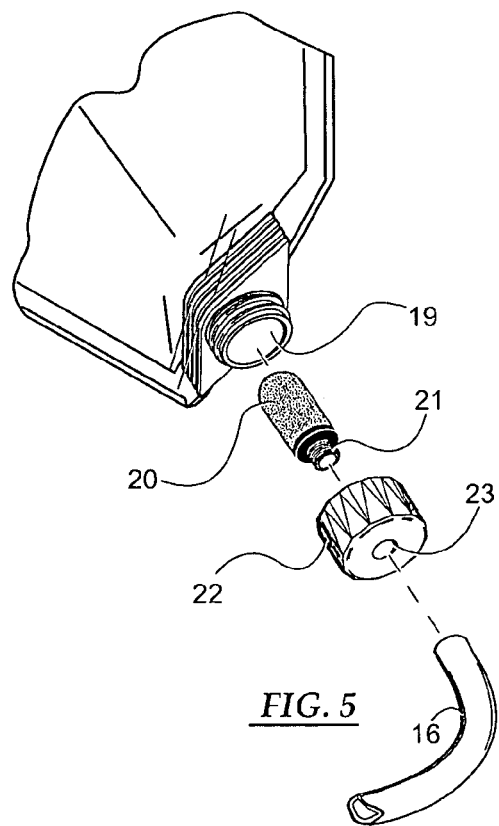
FIG. 5

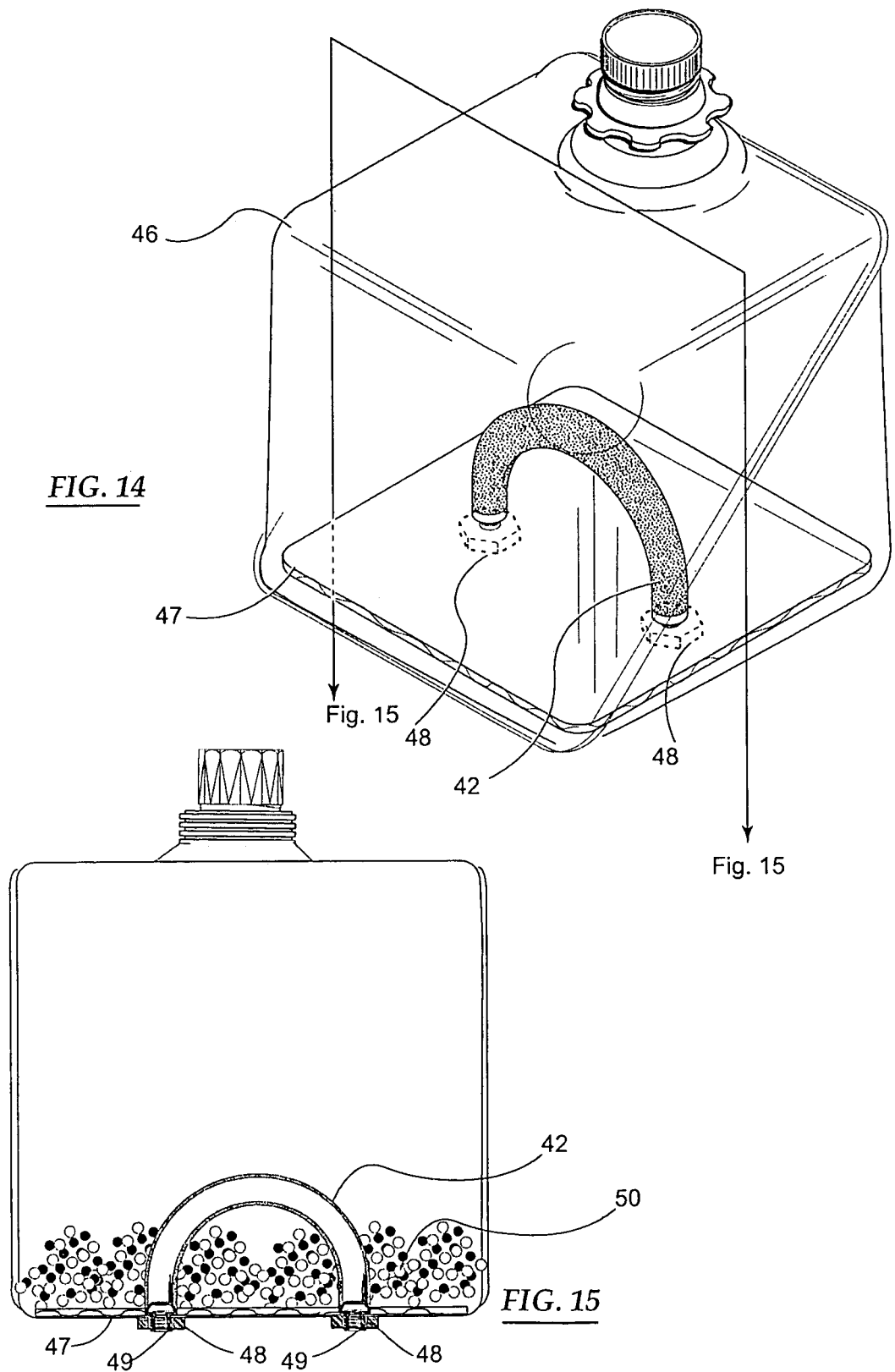

APPARATUS AND METHOD FOR REMEDIATION OF A WASTE STREAM

FIELD OF THE INVENTION

The present invention relates to a dispensing apparatus and method for the generation and delivery over-time of remediation agents into a waste stream, wherein the apparatus is capable of maintaining the continuous delivery of a concentrated remediation composition throughout the delivery cycle. More particularly, the invention relates to a dispensing apparatus and method wherein the remediation agent is a bioremediation agent that contains living organisms.

BACKGROUND

The term wastewater includes sewage and other water that has become contaminated with chemicals or other materials rendering such water unsafe for disposal without treatment. One universal and serious form of water contamination is non-point source pollution (NPS). An example of NPS is urban runoff, wherein rainfall or snow-melt transports widespread, low-level pollutants from surfaces to catch basins connected to below-ground storm water drainage systems that in turn ultimately migrate to neighboring environments such as ponds, marsh or streams. Wastewater remediation treatment strategies are frequently combined with scheduled maintenance programs in order to slow the unwanted accumulation and dissemination of contamination.

Common systems such as floor drains located in areas used for activities such as health care or food processing and preparation are particularly troublesome due to occurrences of food born disease caused by psychotropic, pathogenic microorganisms known to breed in such drains.

Bioremediation is the term given to treatment processes that utilize microorganisms for the digestion or biological degradation of hazardous substances to produce substances that are less toxic or nontoxic. Bioremediation protocols have been extensively and successfully utilized in the treatment of many types of aqueous waste. Microbial agents known to have bioremedial utility in controlling organic and inorganic contaminants found in aquatic or terrestrial environments include bacteria, algae, fungi, yeast, protozoa and the like as well as cell-free extracts of such organisms and combinations thereof. Several commercial bioremediation preparations utilizing naturally occurring microorganisms alone or in combination are readily available for the degradation of a variety of pollutants such as herbicides and other agricultural chemicals, industrial solvents and cleaners, medical waste, and various other products found to be environmentally hazardous. Furthermore, advanced technologies for selection, isolation and attenuation of the remediation effectiveness of useful bioremediation organisms have steadily and substantially improved over the past two decades. Bioremediation can also be used in conjunction with a wide range of physical and chemical technologies.

In addition to readily available commercial bioremediation preparations, many microorganisms determined to be useful in bioremediation systems have been recently identified, isolated and cultured. For example, U.S. Pat. No. 6,194,197 to Hyman et al. discloses a *Graphium* sp. fungus capable of co-metabolizing the common gasoline additive; methyl tert-butyl ether (MTBE). U.S. Pat. No. 6,096,530 to Kato et al. discloses a strain of *Pseudomonas cepacia* isolated from termite intestine that degrades the water-contaminating industrial degreasing solvent trichloroethylene (TCE) as well as various furan compounds.

Also available for use in waste treatment systems are strains of genetically modified microorganisms which are capable of degrading numerous environmentally persistent waste chemicals such as pesticides, herbicides, fire retardants, propellants, and the like which have been described over the past twenty years. For example, U.S. Pat. No. 4,535,061 to Chakrabarty et al. describes modified strains of *Pseudomonas cepacia*: that degrade polychlorinated biphenyls (PHB's). More recently, U.S. Pat. No. 5,578,474 to Focht et al. describes construction of new recombinant strains of microorganism genera such as *Pseudomonas, Alcaligenes, Acinetobacter* or *Arthrobacter*, which are useful in the disposal of toxic waste such as chlorobenzene. Furthermore, such modified organisms can be produced in quantity by commercially useful processes.

It is well known in the art that contaminant reducing agents, including microbial agents useful in the control of both organic and inorganic contaminants in aquatic or terrestrial environments, are often immobilized by inoculating or affixing to an appropriate immobilizing support medium. Suitable immobilizing media include, but are not limited to, woven and non-woven scaffolding; natural and synthetic matrices; high surface-area inert solids; and other materials containing voids and channels in which the agents can reside. Such materials are easily obtained and many commercial bioremediation preparations utilizing immobilizing media are commercially available.

In order to be effective in bio-remediation a treatment system must be capable of maintaining a sufficient concentration of active, healthy organisms throughout the process. Therefore, effective systems for bioremediation must be capable of delivering measured quantities of treatment agents, including microorganisms, continuously at a predetermined rate over time. Incremental release has shown to be useful when establishing the biomass augmentation that is important to a successful bioremediation treatment strategy. Treatment systems that rely on manual delivery of remediation formulations are generally ineffective. For example, U.S. Pat. No. 5,225,083 to Passas et al. discloses a method for bioremediation of grease traps involving a periodic manual delivery of a bacterial remediation agent along with other additives. Such manual methods have numerous associated drawbacks including inappropriate agent levels and incorrectly timed scheduled for release. Furthermore, these manual delivery methods are particularly ineffective when the system encounters temporary fluctuations of pH in the wastewater stream. Also, these methods can result in a condition wherein bacterial media delivered as a bolus receive inadequate oxygen and/or nutrients.

A variety of direct contact methods for the continuous dispensing of remediation agents into waste streams have been described. A system for seeding bacterial cultures to a waste stream is described by Hater et al. in U.S. Pat. No. 4,810,385. The system utilizes a simple device consisting of a textile package or sock filled with dried bacterial cultures or microorganisms suitable for degrading waste. In use, the sock is immersed in a waste stream and as sewage flows through the sock the dried bacteria are wetted and released into the stream. Another direct contact device for bioremediation of waste collection systems wherein a dissolvable solid bioactive element is submersed in the waste stream is described by Cline in U.S. Pat. No. 5,925,252. The dispensing of the active agent in this system relies solely on the dissolution of the solid bioactive element; therefore the rate of addition is not well controlled, since the rate of dissolution is greatly affected by external conditions such as temperature, pH and tonicity. Furthermore, such systems require the use of additives such as surfactants to produce the dissolvable solid bioactive element thereby limiting the scope of utilizable microorganisms.

A simple apparatus for treating drain runoff described by Richter et al. in U.S. Pat. No. 6,197,321 also relies solely on the dissolution of a solid bioactive element and therefore has the same limitations as the aforementioned U.S. Pat. No. 5,925,252. Furthermore, the device described by Richter reduces the receiving capacity of the drain and raises health and safety concerns regarding the placement, removal, and disposal of remnants. Additionally problems can arise due to misalignment and incorrect placement of the device resulting in resulting in blockage and activation failures.

Another deficiency associated with all of the direct contact methods described above is the requirement for ample direct access for the placement of the devices and attachment points for securing the devices. Also, since these systems provide little or no control of the release rate of active agents, the velocity of the waste stream rather than the level of contamination of the waste stream controls the release rate. For example, streams having high levels of contamination and low flow velocities release insufficient quantities of agent while streams having low levels of contamination with high waste stream flow velocity or volumes release excess quantities of agent. Another drawback of direct contact systems is premature surface activation which is an operational malfunction resulting from low flow conditions wherein a bio-coating forms on the surface of the solid agent resulting in encapsulation and thereby impeding the delivery of the active agent. Furthermore, these direct contact devices and systems often give unpredictable results when utilized in static, shallow, and surface waters and are not applicable to terrestrial environments.

A dispensing apparatus for introducing treatment material into an inceptor or grease trap for the purpose of digesting grease or other hazardous materials is disclosed by Heppenstall in U.S. Pat. No. 5,271,829. This apparatus is specific to grease traps and similar systems and is retrofitted to such systems by fixed attachment to the inside of the lid of the inceptor or grease trap. The dispensing apparatus of this system provides a porous rubber restrictor in the form of a flat disc located at the dispensing opening to providing a constant restricted dispensing rate. Such a restrictor may be prone to clogging during use. Also, the disclosed apparatus is limited to use with treatment solutions thereby precluding its use with remediation agents fixed to insoluble immobilizing media.

A bilge cleaner dispenser and method of dispensing liquid bilge cleaner is described by Clement in U.S. Pat. No. 6,152,331. This apparatus is used to treat trapped contamination contained in boat bilges and utilizes an orifice-type mechanical flow regulator to control the rate of addition of the liquid. Such orifice-type flow regulators suffer from a number of disadvantages and are prone to internal interruption and malfunctions caused by build-up from a migrating particulate-laden stream and from side products including bio-film associated with biological treatments. Furthermore the described apparatus is limited to use with only liquid cleaners thereby precluding use with remediation agents fixed to insoluble immobilizing media.

An apparatus for delivering activated microorganisms to an aqueous waste stream is described by Lucido et al. in U.S. Pat. No. 6,402,941. The apparatus is relatively complex in that it provides multiple containers each provided with independent pumping means. Furthermore, one container of the described apparatus is a bioreactor chamber in which the required organisms must be first grown prior to delivery. Another complex apparatus for delivering activated microorganisms to an aqueous waste stream is described by Lucido et al. in U.S. Pat. No. 5,840,182 wherein a multi-chambered bioreactor is operably connected a controller.

Remediation systems utilizing electrically powered components are well known in the art. However, electrically operated metering pumps, dispensing systems and delivery methods suffer from a numerous disadvantages. For example, potential safety hazards become obvious when utilizing electrical powered metering pumps requiring electrical interfaces in close proximity to drainage systems that often contain corrosive substance and sewer gas. Storm water drainage systems frequently receive vehicle fluids including oil and gasoline washed from surfaces into drainage systems by storm water and snow melt creating potentially dangerous conditions in proximity to electrical components. Therefore, due to increasing personal safety and insurance liability issues, many states and local jurisdictions have promulgate enforcement codes where only licensed personal are authorized to install, maintain, relocate or alter remediation systems utilizing electrical components. Finally, such electrical devices are often complicated and expensive to manufacture and maintain.

In view of the prior art there exists a need for a readily portable bioremediation apparatus capable of delivering predetermined, measured quantities of treatment agents, including microorganisms, to a wastewater stream continuously over time.

There exists also a need for a low-cost apparatus for the remediation or bioremediation of wastewater that is simple in construction and user friendly.

Furthermore, a need exists for apparatuses and methods for remediation or bioremediation of wastewater that are easily customized to address specific requirements for a given wastewater stream.

A still further need exists for apparatuses and methods for remediation or bioremediation of wastewater that dispense the treatment agents without the need for external power or electrical interface.

The devices and methods of the present invention address these and other needs.

BRIEF DESCRIPTION OF THE DRAWINGS

FIG. 1 is a perspective view of an assembled apparatus positioned to deliver a remediation composition into a drain.

FIG. 2 is a cross-sectional view of the apparatus depicted in FIG. 1.

FIG. 4 is a perspective view of an apparatus with a pouch reservoir positioned to deliver a remediation composition into a drain.

FIG. 5 is an exploded perspective view of the dispensing portion of the apparatus depicted in FIG. 4.

FIG. 14 is perspective view of an apparatus with a U-form porous dispersing element mounted within a cube shaped reservoir.

FIG. 15 is a cross-sectional view of the apparatus of FIG. 14 wherein the reservoir additionally contains solid remediation material.

Figure 3:
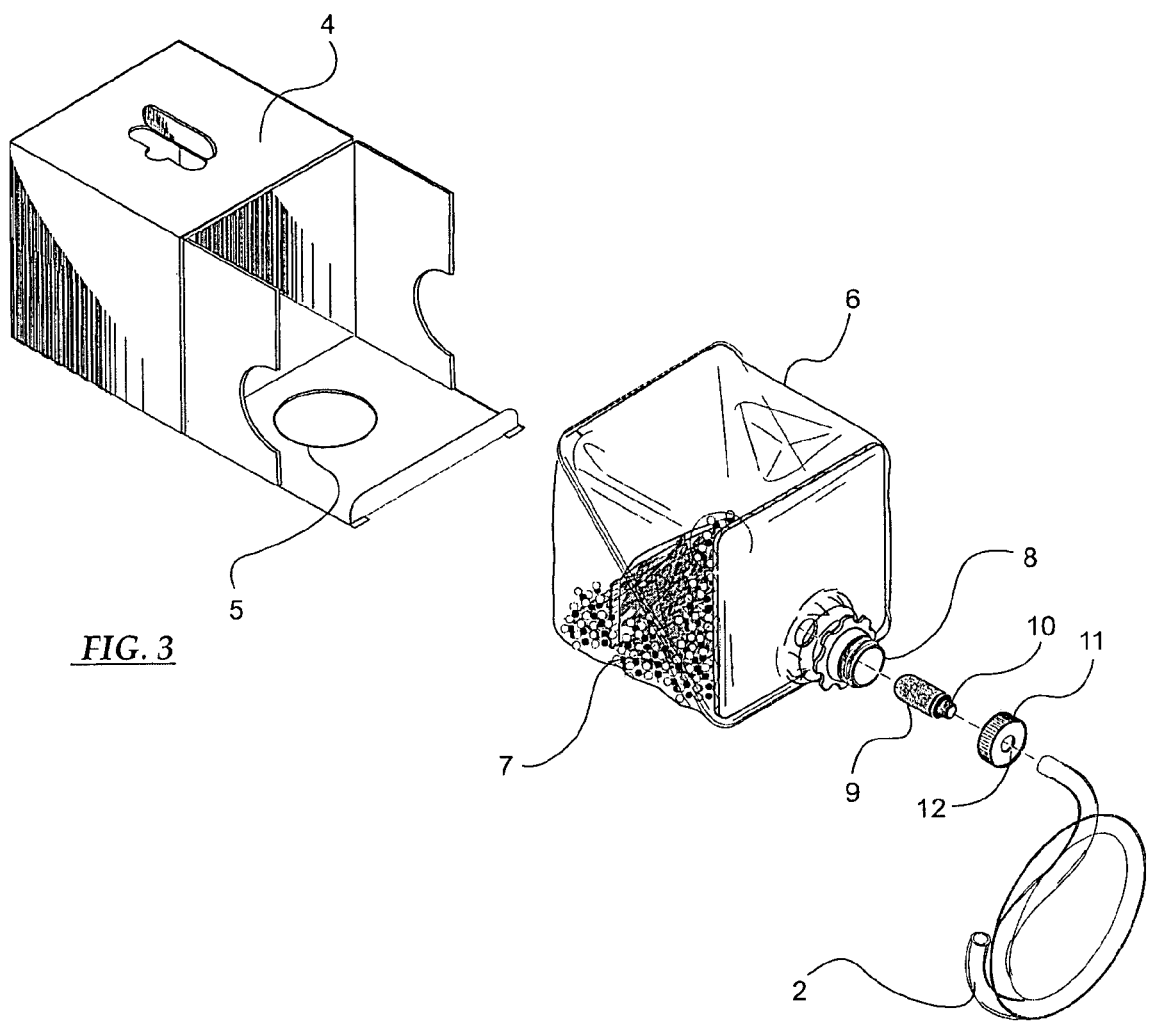
FIG. 3 is an exploded perspective view of the apparatus depicted in FIG. 1.

Although the figures illustrate preferred embodiments of the invention they are intended to be merely exemplary and representative of certain embodiments. To that end, several figures contain optional features that need not be included in any particular embodiment of the invention and the shape, type, or particular configuration of the various elements of the apparatuses illustrated should not be regarded as limiting to the invention.

SUMMARY OF THE INVENTION

The present invention relates to the treatment of contamination in both aquatic and terrestrial environments by providing apparatuses, systems and methods for delivery of remediation compositions into waste streams.

In general an apparatus consists of a reservoir provided with a dispensing element comprising a hollow cylindrical or tubular body having a wall at least a portion of which is porous and of a pore size that renders the wall pervious to liquid borne compositions while impervious to solid retents, i.e. insoluble remnants such as inorganic and organic matrix materials, cell debris, insoluble minerals, insoluble salts and the like. In essence this hollow cylindrical or tubular body defines an interior cavity the volume of which is determined by the tubular body diameter, length and wall thickness.

The dispensing element is constructed such that a liquid borne composition from within the reservoir can pass through the porous portion of the wall to the outside of the reservoir. In use the apparatus is oriented such a liquid borne composition from within the reservoir is dispensed by gravity into a waste stream over time. Such an apparatus is capable of generating and maintaining a concentrated remediation stream throughout the delivery cycle. Also, the dispensing element essentially functions as a valve that controls the rate at which a liquid borne remediation composition is dispensed from the reservoir, wherein the rate of dispensing is determined, at least in part, by the size of the reservoir, geometry of the dispensing element, the pore size and pore volume of the porous portion of the wall of the dispensing element and/or the characteristics of the remediation composition.

In one embodiment the dispensing element consists of a hollow cylindrical tubular body with a porous wall wherein the tubular body has one open end and one closed end, the closed end having a convex outer surface. In a preferred embodiment the convex surface of the closed end is essentially hemispherical. Such a dispensing element is positioned such that the closed end and the porous portions of the wall are within the reservoir and the open end is fixedly disposed within a suitable, opening in the reservoir such a liquid-borne composition from within the reservoir can pass through the porous-wall to the outside of the reservoir.

In another embodiment the dispensing element consists of a hollow cylindrical tubular body having a porous wall and formed into an arc or arch shape with two open ends. In a preferred embodiment the arc is essentially a 180-degree arc. This form of the dispensing element is positioned such that the porous cylindrical tubular body is disposed within the reservoir and wherein each of the two open ends is fixedly disposed within a suitable opening in the reservoir such a liquid-borne composition from within the reservoir can pass through the porous portion of the wall to the outside of the reservoir.

Suitable reservoirs for the apparatuses of the present invention include any vessel capable of containing a liquid and being fillable through at least one opening. The reservoir may be provided with a single opening or a multiplicity of openings in order to accommodate one or more dispensing elements. In preferred embodiments the reservoir is a rigid vessel, a semi-flexible, a collapsible vessel, a flexible bag or a flexible pouch.

The liquid-borne remediation agents deliverable by the apparatuses of the present invention include any remediation agent that is at least partially soluble, partially dispersable or partially emulsifiable in the liquid. In certain preferred embodiments the liquid is water and the remediation agents are bioactive or bioactivatable agents that may include bacterial cultures, cells, vegetative microorganisms, bacteriophages, spores, algae, fungi, enzymes or combinations thereof.

In certain preferred embodiments remediation agents or components of remediation agents are disposed upon or disposed within solid immobilizing media. In other preferred embodiments remediation agents within the reservoir are sealed within water-dispersible or water-soluble packets. In such embodiments the introduction of water or some other suitable aqueous composition into the reservoir solubilizes, disperses, emulsifies, generates, activates or propagates one or more of the remediation agents to afford an effective waterborne remediation composition.

A typical method of the present invention for remediation of a waste stream comprises the steps of: (i.) providing any of the embodiments of the dispensing apparatuses described herein; (ii.) introducing a liquid-borne remediation composition into the reservoir of the apparatus; and (iii.) orienting the apparatus with respect to a waste stream such that the liquid-borne remediation composition from with the reservoir is continuously delivered through the dispensing element to the waste stream over time.

Another typical method of the present invention for remediation of a waste stream comprises the steps of: (i.) providing any of the embodiments of the dispensing apparatuses described herein wherein the reservoir of the apparatus contains one or more water-soluble, water-dispersable or water-emulsifiable remediation agents in dry form that may include vegetative microorganisms, spores, cells, bacterial cultures, bacteriophages, algae, fungi, enzymes, nutrients, micronutrients, buffer salts, activators, soaps, detergents, lipids, carbohydrates, or combinations thereof; (ii.) introducing into the reservoir water and/or one or more of aqueous remediation agents that may include buffer solutions, activator compositions, nutrient compositions, surfactants, bio-stimulating compositions and oxygen producing compositions; (ii.) maintaining the resulting contents of the reservoir for a period of time sufficient to generate, release, solubilize, disperse, emulsify, activate or propagate components of said one or more remediation agents to afford an effective waterborne remediation composition; and (iv.) orienting the apparatus with respect to a waste-stream such that the waterborne remediation composition from with the reservoir is continuously delivered through the dispensing element to the waste stream over time.

DETAILED DESCRIPTION OF THE INVENTION

For the purposes of the invention described herein, the terms listed below shall have the following respective meanings:

The term "porous" is herein defined as a property of a material having numerous small interconnecting pores, holes or channels that render a material permeable or pervious to liquid-borne compositions.

For purposes of the invention described herein, the terms "pore size" and "average pore diameter" are synonymous and are classified according to the International Union of Pure and Applied Chemistry (IUPAC) Subcommittee of Macromolecular Terminology, Feb. 26, 2002.

The "pore volume" is the sum of the volumes of all pores in given quantity of porous material. The "percent porosity" is the void volume fraction of a porous material multiplied by 100. For the purposes of the invention described herein, the terms "pore volume" and "void volume" are synonymous and the term "percent porosity" will be used to describe the volume of the void space in a porous material.

The term "liquid-borne composition" is herein defined as a solution, an emulsion, a suspension or any combination thereof.

The term "waterborne composition" is herein defined as "liquid-borne composition" wherein the liquid is water.

The term "retent" refers to that fraction of a liquid composition or a liquid/solid mixture that is retained by a porous barrier; retents may be solids, semi-solids, gels, polymeric liquids or combinations thereof.

The present invention relates to apparatuses, systems and methods for the remediation of a waste streams. In particular, the invention is directed to devices and systems for generating, maintaining, and dispensing over-time a remediation stream containing various agents including bioactive agents to treat waste including contamination in both aquatic and terrestrial environments. The apparatuses and systems are suitable for use in numerous situations including, but not limited to, surface water, standing sallow wastewaters and there tributaries and conduits, floor drains, grease traps, non-point source pollution (NPS), septic tanks, boat bilges and the like.

In general, the apparatus consists of a reservoir containing at least one remediation agent, at least one porous dispensing element attached to the reservoir and at least one opening in the reservoir through which a liquid can be introduced. In use the reservoir is filled with suitable liquid and the apparatus is positioned so that the liquid-borne remediation composition from with the reservoir is continuously dispensed by gravity through the porous dispensing element and is thereby delivered to a waste stream. In part the porous dispensing element acts as a filter to retain inert solids while allowing active waterborne remediation components to pass through. In another sense the porous dispensing element acts essentially as a valve to control the rate at which the waterborne remediation composition is delivered. The aqueous composition passing through the porous dispensing element can be a solution, an emulsion, a suspension or any combination thereof. A typical apparatus is illustrated in FIG. 3 depicting a reservoir 6 containing solid remediation components 7, a porous dispensing element 9 and a reservoir opening 8.

Any vessel capable of containing a liquid may function as a reservoir for the purposes of the present invention. Such as reservoir is provided with a single opening or a multiplicity of openings in order to accommodate one or more dispensing elements. Also, the reservoir must be fillable through at least one opening. The dispensing element may be disposed with the same opening used for embodiments one or more of the openings in the reservoir is provided with a suitable closure means such as a screw-cap, friction-fitting cap, stopper, bung, plug, or the like. An open end of a dispensing element may be sealably fixed within a reservoir opening by using any of suitable sealing means. In one embodiment an open end of a dispensing element is appropriately sized to friction fit in a reservoir opening. In another embodiment an open end of a dispensing element is friction fit into an appropriately sized hole in a cap, stopper, bung, plug, or the like that is used to close an opening in the reservoir. In a preferred embodiment an open end of the dispensing element is provided with screw thread which is engageable by an appropriately sized hole in a cap, stopper, bung, plug, or the like that is used to close an opening in the reservoir. The sealing means may also include any of the various types of sealants, caulking, o-rings, gaskets, washers, and the like commonly used to insure a liquid tight seal.

The reservoirs may be of any shape and size and the holding capacity of such reservoirs useful in embodiments of the invention is in no way limited. In practice, the capacity of the reservoir is chosen with respect to suitability for specific applications. For example, in applications such as remediation of drains in homes, floor drains in garages, small grease traps and the like, a reservoir with a holding capacity in the range of about 1.0 to 25 L may be suitable, while larger applications such as decontamination of soil and ground water containing hydrocarbons or other chemicals resulting from leaking underground storage tanks, transfer line leaks, spills and the like may require reservoirs with holding capacities up to 5,000 L or more. Suitable reservoirs may be fabricated from any suitable material including, but not limited to plastic, metal, glass, ceramic, wood, and mixtures or composites thereof.

In certain embodiments the reservoir is a rigid vessel such as drum, barrel, bottle, jar, jug, carboy or the like fabricated from any suitable material including, but not limited to, wood, ceramic, glass, metal, plastic and composites, blends and combination thereof.

In certain other embodiments the reservoir is a semi-flexible vessel fabricated from one or more plastic materials. Suitable semi-flexible plastic reservoirs may assume a variety of forms including, but not limited to, bottles, jars, jugs, carboys, and the like in shapes such as a round, cubic and rectangular. Semi-flexible plastic reservoirs in the form of cubes are particularly useful in certain embodiments. Plastic materials particularly suitable for the fabrication of semi-flexible plastic reservoirs include polyvinyl chloride compositions and polyolefins such as polyethylene, low-density polyethylene (LDPE), linear low-density polyethylene (LLDPE), ethylene-propylene copolymers, polypropylene as well as blends or alloys thereof as well as cellulose acetates, polyesters, polyurethanes, nylons and combinations thereof.

In certain embodiments the reservoir is a semi-flexible vessel designed to collapse as the contained liquid is dispensed. In still yet other preferred embodiments the reservoir is disposed within an outer housing such as a corrugated box that aids in protecting the liquid-filled reservoir. Such an outer housing is also useful in maintaining the reservoir in the proper orientation to allow liquid to flow by gravity from the reservoir and through the dispensing element. Reservoirs of this type may be provided with a single opening or multiple openings and may be provided with single or multiple dispensing elements. After use, such a collapsible reservoir with housing is easily collapsed for convenient disposal. Particularly useful as reservoirs in these embodiments are containers such as the flexible, low-density polyethylene, cube-shaped containers inside corrugated cardboard outer cartons sold under the trademark CUBITANER™ by BestContainers, Inc. Eagle, Id. Such containers may be transparent or translucent.

Also useful in embodiments of the present invention are reservoirs in the form of tough plastic bags that can be pillow shaped and may incorporate a variety of seam configurations to enable such bags to hold up to 18,000 gallons of liquid. Particularly useful are commercially available flexible, collapsible, spouted bags that are held inside and supported by a rigid outside container. Such bags are generally fabricated from plastic film and may incorporate a single or multi-layer construction using single materials or combinations of different materials. Additionally, such bags can be designed to provide various degrees of toughness as required for a specific application and the film from which the bag is fabricated may be metallized to provide gas barrier properties if required. Such bag-in-box systems are available from Scholle Corporation, Northlake, Ill.

Another particularly useful flexible bag reservoir is the GRIP™ hanging bag system available from Scholle Corporation, Northlake, Ill. This bag incorporates an integral dual handle feature that maximizes functionality and convenience for positioning the reservoir and dispensing the remediation composition there from. Still other containers useful as reservoirs for the purposes of the present invention are the series of liquid liners, tank liners, and squeeze bags available under the trademark RHINO™ from Scholle Corporation, Northlake, Ill. These RHINOT™ products are used in combination with boxes, bags, crates, barrels, cages, or other containers.

Essentially all of the commercially available containers suitable as reservoirs in the present invention are available with a wide variety of fittings and caps in various sizes and styles and in many commercially available containers such fittings are integrally molded.

FIGS. 1, 2 and 3 all depict an embodiment wherein the apparatus comprises a transparent cube-shaped container inside corrugated cardboard outer carton a assembled apparatus 1 is provided with an attached length of a flexible delivery conduit 2 and wherein the apparatus 1 is oriented to deliver the liquid content of the reservoir into a drain 3. An exploded view of the same apparatus is depicted in FIG. 2 wherein the reservoir 6 contains a dried remediation composition 7, the outer housing 4 is provided with an opening 5 to accommodate the dispensing assembly comprising a reservoir opening 8, a porous closed-end dispensing element 9, a retainer cap 11 and a length of a flexible delivery conduit 2. In this embodiment the reservoir 6 is filled with liquid through the same opening 8 into which the dispensing element 9 is positioned. The dispensing element 9 is provided with screw threads 10 that sealably fix within the opening 12 in retainer cap 11.

The method of use of the embodiment illustrated by FIGS. 1, 2 and 3 comprises the steps of: (i) filling the reservoir 6, containing the dry remediation composition 7, with a suitable liquid composition; (ii) affixing the dispensing element 9 within retainer cap 10 and affixing retainer cap 10 to the reservoir 6; (iii) maintaining the contents of the reservoir 6 for a period of time sufficient to release, solubilize, disperse, emulsify, generate, activate or propagate components of said one or more remediation agents to afford an effective liquid-borne remediation composition; and (iv) positioning the fully assembled and filled apparatus such that the liquid-borne remediation composition is continuously dispensed by gravity into a waste stream.

In other preferred embodiments the reservoir is a flexible pouch or bag that is essentially flat in its unfilled state. One practical advantage of such a flattened pouch reservoir is that it may be conveniently rolled or folded for convenient shipping and storage. These pouch reservoirs may be provided with a single opening or multiple openings for filling and/or to accommodate one or more porous dispensing elements. In certain embodiments the reservoir is sufficiently transparent or translucent to permit the user to ascertain the liquid, level of the contents during use. The pouch-type reservoirs, of these embodiments are ideally constructed from a water impermeable non-woven fabric or flexible film made from polymers such as polyolefins, polyethylene, high-density polyethylene (HbPE), low-density polyethylene (LDPE), linear low-density polyethylene (LLDPE), ethylene-propylene copolymers, polypropylene, polyvinyl acetate, polyurethane, polyvinylchloride, polyvinylidene chloride, cellulose-acetate, polyester, nylon, and rubber compositions as well as blends, alloys and composites thereof. In FIG. 4 is illustrated a fully assembled apparatus with a flexible pouch reservoir 14, wherein the apparatus is positioned to deliver a remediation composition into a drain 24 with the aid of an optional length of flexible conduit 16 which is attached to the open end of porous dispensing element 20.

Figure 6:
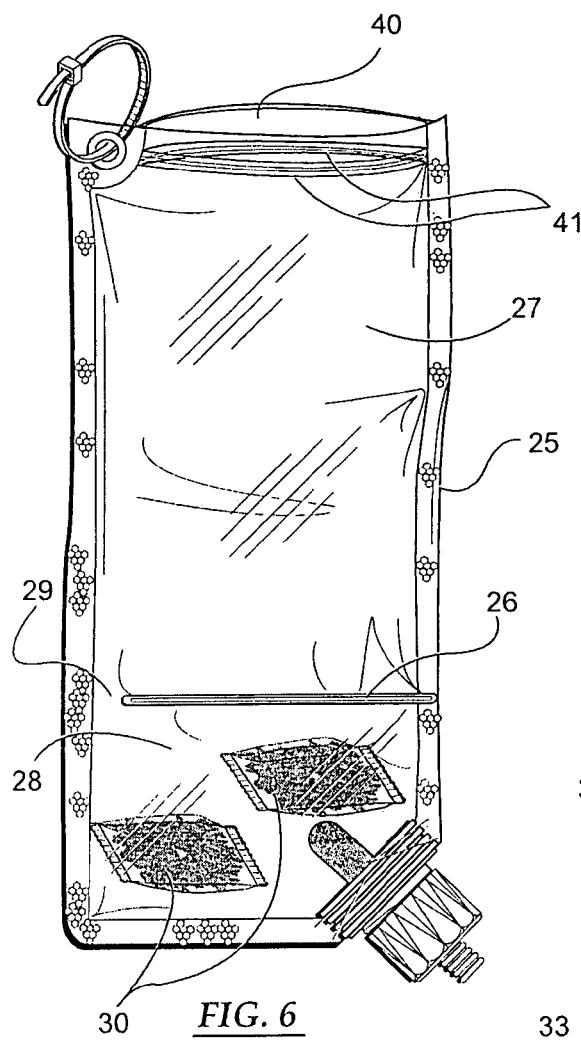
FIG. 6 is a frontal view of an apparatus with a transparent, flexible pouch reservoir with an open top wherein the pouch is provided with a single flow restrictor.
Figure 7:
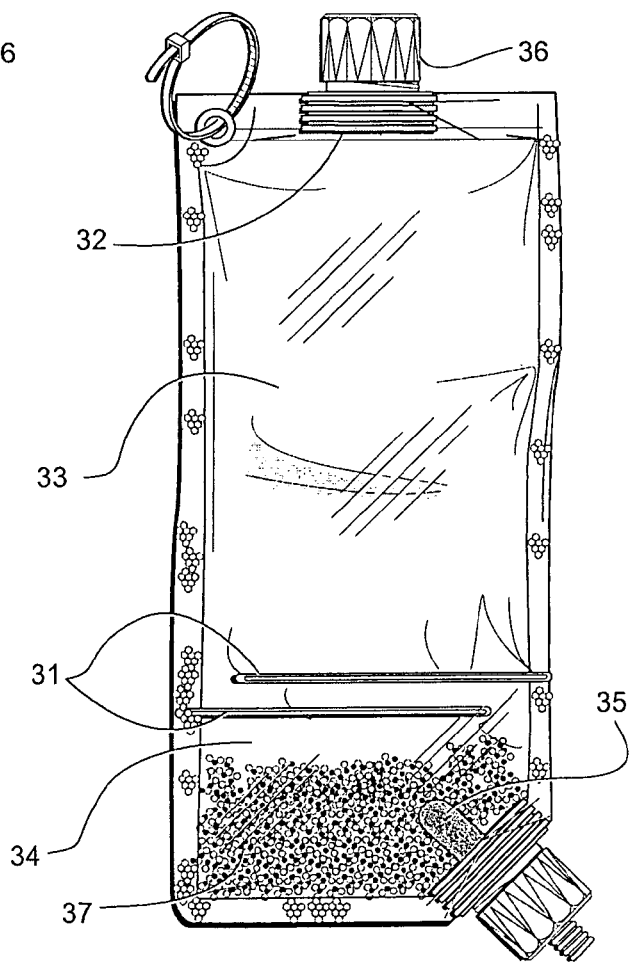
FIG. 7 is a is a frontal view of an apparatus comprising a transparent, flexible pouch reservoir with an opening provided with a cap, and wherein the pouch is provided with a double flow restrictor.
Figure 8:
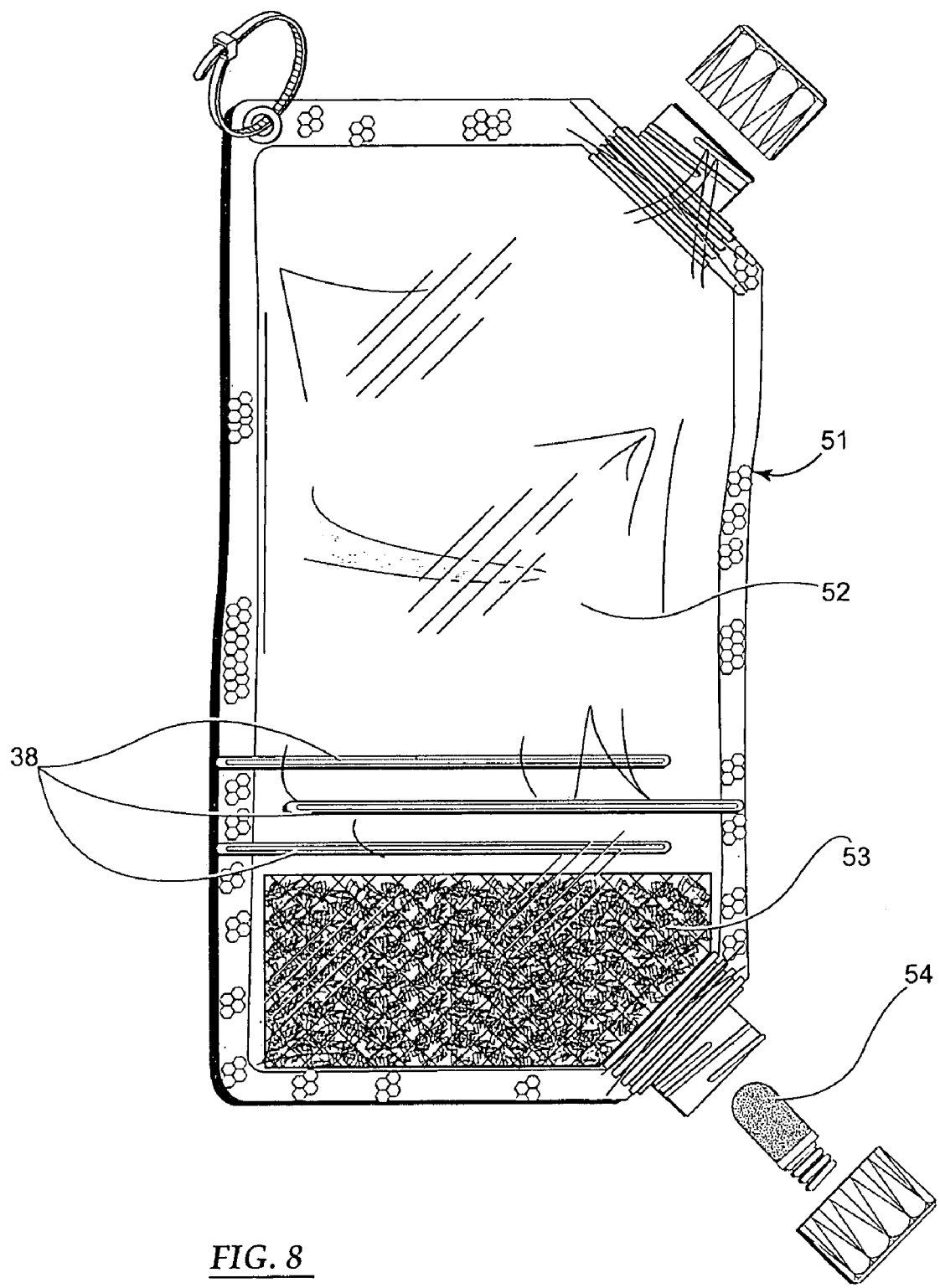
FIG. 8 is a frontal partially exploded view of an apparatus with a transparent, flexible pouch reservoir containing a fibrous batting upon which a remediation material is disposed.
Figure 9:
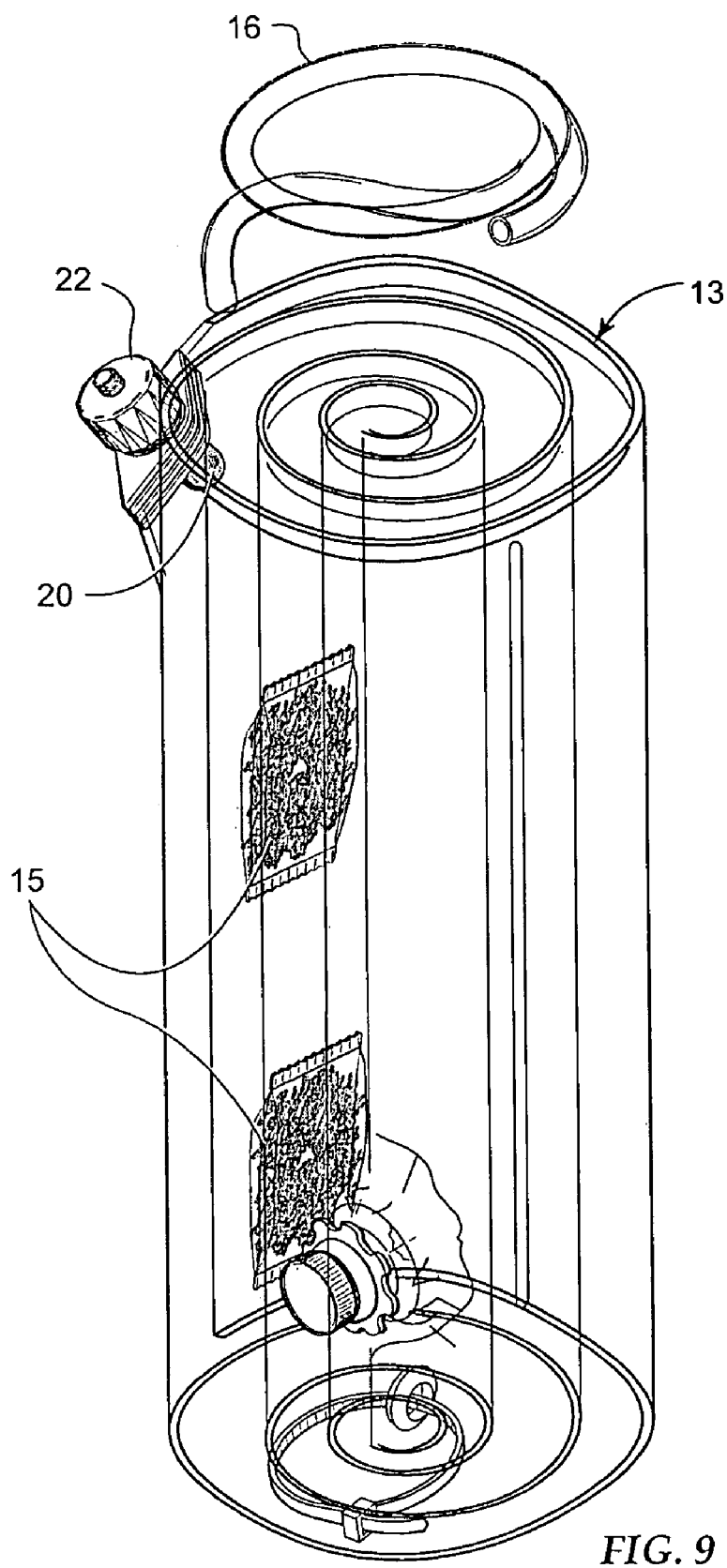
FIG. 9 is a perspective view of an apparatus with a transparent, flexible pouch reservoir in a rolled storage configuration.

In other preferred embodiments the flexible pouch comprises one or more flow-limiting restrictions wherein dry remediation agents are disposed in a space between a flow-limiting restrictions and a dispensing element. An embodiment wherein the pouch reservoir is provided with a single flow-limiting restriction is illustrated in FIG. 6, wherein the flow-limiting restriction 26 is a seam extending partially across the pouch body 25 effectively dividing the pouch into sections 27 and 28 while permitting fluid communication between liquids in section 27 and section 28 through opening 29 and wherein solid remediation agents 30 are disposed within section 28. Other configurations of seams as flow-limiting restrictions are also useful. FIG. 7 is illustrative of an embodiment wherein the two seams 31 form a baffle element which functions as a flow-limiting restriction, while FIG. 8 is illustrative of an embodiment wherein an apparatus 51 comprises a pouch reservoir 52 having three seams 38 that create a baffle element which functions as a flow-limiting restriction. Such flow-limiting seams may be provided by any know means such as sewing, use of a suitable adhesive, heat sealing and the like. Heat sealing is a preferred means for forming such flow-limiting seams in pouches fabricated from thermoplastic materials. Heat sealing is that process by which opposing surfaces of the pouch are thermally fused by means of a heat-sealing device such as the widely available impulse sealers used to heat-seal thermoplastic poly bags. The use of other seam configurations as flow restrictors useful in embodiments of the invention is in no way limited to those illustrated.

As an example of the method of use of an apparatus of these embodiments, the reservoir of the apparatus of FIG. 7 is filled with water or other suitable aqueous composition through the opening 32 and as the aqueous composition from reservoir section 33 flows into reservoir section 34 the dry remediation components 37 are released, solubilized, dispersed, emulsified, generated, activated or propagated to afford an effective waterborne remediation composition that is delivered to a waste stream through porous dispensing element 35. In this manner the baffle formed by flow-limiting restrictions 31 may control both the rate of release, solubilization, dispersion, emulsification, generation, activation or propagation of dry remediation components as well as the overall rate of delivery of the waterborne remediation composition.

In some embodiments of an apparatus with a pouch-type reservoir an attachment means is provided so that the reservoir can be attached to a suitable support member in order to maintain the apparatus in an orientation to allow a liquid-borne remediation composition to readily flow by gravity from the reservoir through the dispersing element into a waste stream. The attachment means may be in the form of perforations such as eyelets or grommets; rigid loops, flexible loops such as self-locking cable ties, web-like loops, hooks, snaps, buckles, clips and the like. In the embodiment of the apparatus illustrated in FIG. 4 the flexible pouch reservoir comprises a means for attachment to an external support in the form of a self-locking cable tie 17 fastened through an eyelet 18. This dispensing element is positioned such that the closed end and the porous portions of the wall are within the reservoir and the open end is fixedly disposed within a suitable opening in the reservoir such a liquid-borne composition from within the reservoir can pass through the porous portion of the wall to the outside of the reservoir In certain embodiments of the invention the porous dispensing element is essentially comprised of a hollow cylindrical tubular body having a proximal closed end with a convex outer surface; a distal open end; and a wall with an inner surface and an outer surface wherein at least a portion of the wall is porous and has a pore size and pore volume that renders the wall pervious to waterborne compositions while impervious to solid retents. In use the dispensing element is positioned such that the cylindrical tubular body passes through an opening in the body of the reservoir such that the proximal closed end and cylindrical tubular body are disposed completely within the reservoir while the distal open end is disposed outside of the reservoir. This configuration allows a liquid-borne remediation composition within the reservoir to pass through the porous wall of the dispensing element and to exit through the distal open end. Therefore the apparatus can be oriented such that liquid-borne compositions from within the reservoir can be dispensed by gravity into a waste stream over time.

Figure 10:
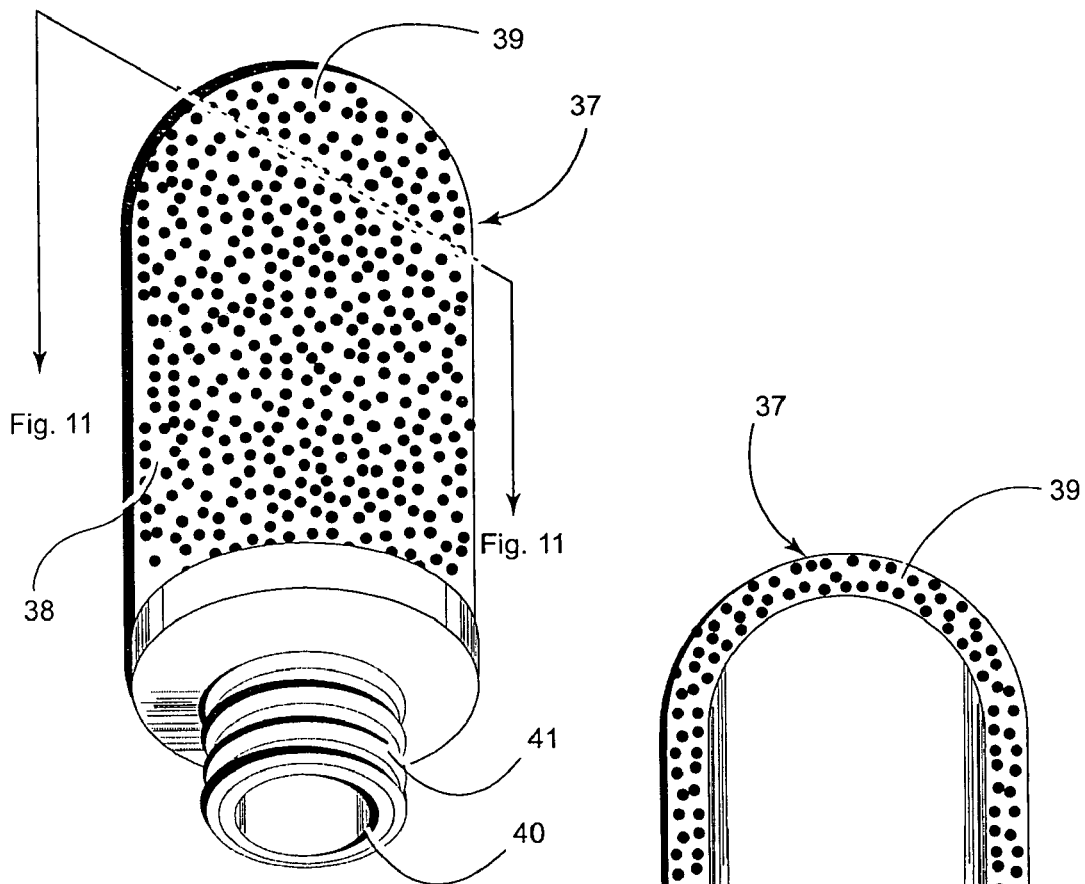
FIG. 10 is a perspective view of a closed-end porous dispersing component.
Figure 11:
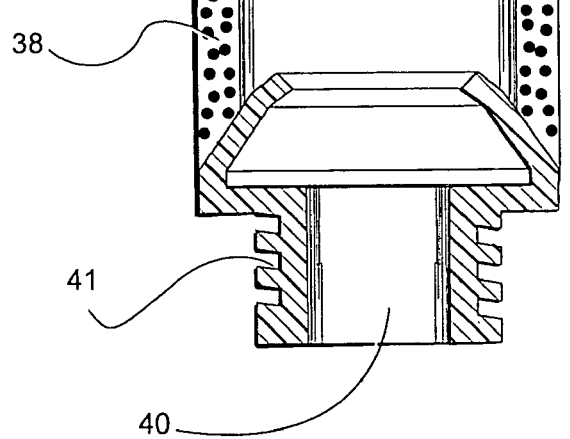
FIG. 11 is a cross-sectional view of the closed-end porous dispersing component of FIG. 10.

In a preferred embodiment of the above described porous dispensing element the contour of the convex outer surface of the closed end of dispensing element is essentially hemispherical and the wall thickness of the porous dispensing element is essentially uniform at all points. Such an embodiment is illustrated in FIGS. 10 and 11. The hemispherical form is important to avoid clogging of the pores of the dispersing element by non-liquid-borne retents or insoluble remnants of the remediation formulation contained within the reservoir. In practice, the hemispherical shape serves the purpose of maintaining a clean unclogged dispensing element since the flow dynamics within such an element have been shown to have a washing effect on the wall of the surfaces of the element. In essence both geometry of the cylindrical tubular body and the hemispherical contour of the outer surface of the proximal open end render the dispensing element self-cleaning during use.

FIG. 10 illustrates such a hollow cylindrical porous dispensing element 39 having a porous wall 38, a proximal closed hemispherical end 39 and a distal open end 40. The porous dispensing element 39 also comprises a connecting means 41 in the form of a screw thread that provides an attachment to secure the dispensing element within a retaining cap as well as an attachment means to secure a length of flexible tubing or hose to the dispensing element. A cross sectional view of the same dispensing element 37 is depicted in FIG. 11 showing the porous portion of the wall having an essentially uniform thickness and pore size. Also the open distal end 40 of the dispensing element 39 is provided with a screw thread 41 that provides an attachment means to secure the dispensing element within a reservoir by means of a retaining cap. Furthermore the screw thread 41 can serve as a conduit attachment means to secure a suitable conduit such as a length of flexible tubing or hose to the dispensing element. Other useful conduit attachment means include nipple fittings, hose fittings, friction fittings and the like.

In certain other embodiments of the invention the dispensing element is comprised essentially of a cylindrical tubular body formed into an arc or arch shape having two open ends and a wall with an inner surface and an outer surface wherein at least a portion of the wall is porous and has a pore size that renders the wall pervious to waterborne compositions while impervious to solid retents. In a preferred embodiment the arc is essentially a 180-degree arc creating an overall U-form. In use this U-form dispensing element is positioned such that the entire porous portion of the cylindrical tubular body is disposed within the reservoir and wherein each of the two open ends is fixedly disposed within a suitable opening in the reservoir such a liquid-borne composition from within the reservoir can pass through the porous portion of the wall to the outside of the reservoir.

Figure 12:
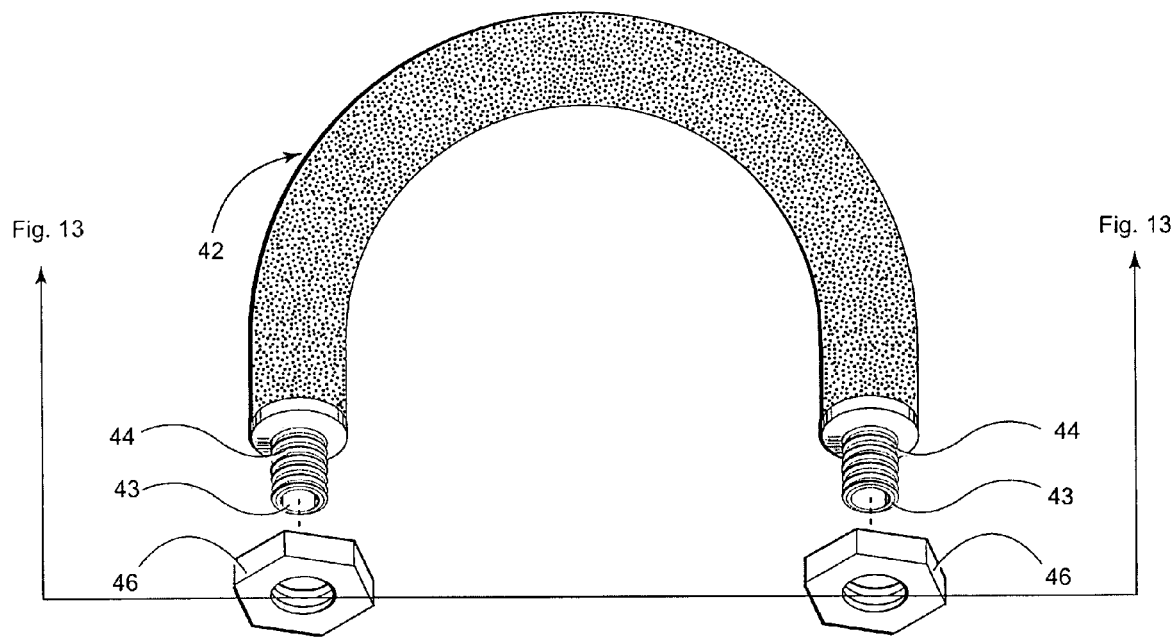
FIG. 12 is a perspective view of a U-form, open-ended porous dispersing element.
Figure 13:
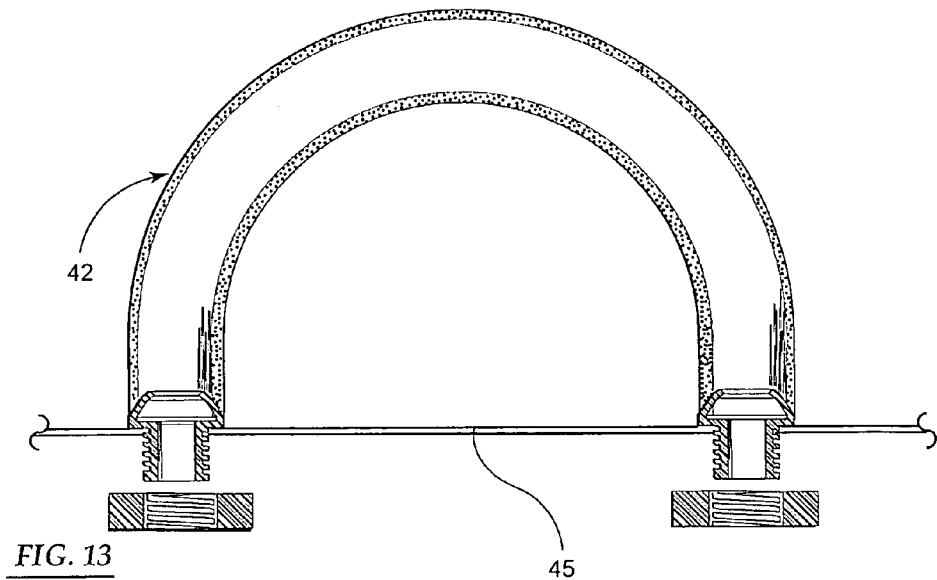
FIG. 13 is a cross-sectional view of the U-form, open-ended porous dispersing element of FIG. 12.

Such a U-form dispensing element can be fabricated from a variety of materials and can be rigid or flexible. In a preferred embodiment a nominally straight cylindrical tubular body is shaped into a U-form to allow for passage of the ends of the tubular body through the openings in the reservoir. In these embodiments, the flexibility of the porous material of fabrication and the wall thickness of the cylindrical tubular body are chosen such that no restriction is created within the tubular body when it is shaped into the required arc or arch. Such an embodiment is illustrated in FIG. 12 and FIG. 13 wherein the open ends 43 of the tubular porous dispensing element 42 comprise threaded connectors 44 which provide an attachment means to secure the dispensing element by means of a retainer nut 46 or retainer cap. Furthermore the screw thread 41 can serve as a conduit attachment means to secure a conduit such as a length of flexible tubing or hose to the dispensing element. Other useful conduit attachment means include nipple fittings, hose fittings, friction fittings and the like.

A preferred embodiment is depicted in FIGS. 14 and 15 wherein a U-form dispensing element 42 is mounted within a transparent flexible cubic reservoir 46, wherein the two threaded ends 49 of dispensing element 42 pass through two openings in the reservoir base 47 and are sealably fixed with retaining nuts 48. The cross-sectional view of the apparatus depicted in FIG. 14 also depicts dry remediation components 50 within the reservoir 46.

Any of the porous dispensing elements herein described may be fabricated from any of a wide variety of porous materials including but not limited to polymers, plastics, synthetic rubbers, natural rubbers, rubber compositions, elastomers, thermoplastic elastomers, glasses, ceramics and metals as well as combinations and composites thereof. Such combinations of materials may be intimate mixtures such as those provided by alloying or blending; may be layered to provide laminate structures; or may be combined to provide composite structures.

Preferred porous metals include stainless steel, aluminum, zinc, copper and its alloys. Preferred porous glass and ceramic materials include quartz, borosilicatse, aluminosilicates and sodium aluminosilicates. Useful porous plastics for construction of the porous dispensing element include polyolefins, polyethylenes, polypropylenes, poly(ethylene/vinyl acetate), polyesters, polyamides, polyacetals, poly(acrylonitrile-butadiene-styrene), polyacrylates, polymethacrylates, fluoropolymers, and polyvinylchloride. Particularly useful porous plastics are various types and grades of polyethylene, polypropylene and their copolymers. Also particularly useful are porous plastics comprised of fluoropolymers such as poly(tetrafluoroethylene), fluorinated poly(ethylene/propylene), polyvinyl fluoride, polyvinylidine fluoride as well as blend, alloys and composite thereof.

Useful porous elastomers or rubbers for the construction of the porous dispensing elements described in this invention include vulcanized natural rubber compositions, thermoplastic elastomers (TPE), elastomeric polyvinyl chloride, styrene-butadiene rubber (SBR), butyl rubber, ethylene-propylene rubber (EP), acrylonitrile-butadiene rubber (NBR), polyisoprene, polychloroprene, silicone rubber, fluorosilicone rubber, polyurethanes, nitrile rubber, elastomeric polyurethane, and fluoroelastomers. Preferred thermoplastic elastomer (TPE) categories include thermoplastic olefins (TPO), styrenic block copolymers (SBC) including styrene-butadiene-styrene (SBS), styrene-isoprene-styrene (SIS), styrene-ethylene/butylene-styrene (SEBS), styrene-ethylene-propylene-styrene (SEPS) and polyether block copolyamides (COPA) and including those commercially available under the trademark PEBAX®. Also useful are elastomeric PVC blends, alloys and compositions.

The porous dispensing elements herein described have a wall ideally comprised of porous materials with an average pore size in the range of about 5 to 500 microns, preferably within the range of about 10 to 200 microns and most preferably within the range of about 10 to 100 microns. The percent porosity of such porous materials is preferably from about 10% to 90%, and most preferably from about 30% to 75%.

For a delivery apparatus of the present invention, the ratio of the volume of the interior cavity of the dispensing element to the pore volume of the porous wall is an important factor. The interior cavity of the dispensing element must be of a configuration and volume capacity sufficient to receive, direct and convey by gravity a liquid-borne remediation composition at the delivery rate required for a given application, while the wall of this dispensing element must be of a pore size and pore volume sufficient to allow the liquid-borne remediation composition to readily pass through the wall and for retents to be held within the reservoir of the apparatus. Ideally for a delivery apparatus of the present invention the ratio of the interior cavity volume to the total pore volume of the wall is at least 0.5.

While there is no restridtion to the wall thickness, the overall porous wall structure must be such that the water-borne elements of remediation compositions can freely pass through the wall at an effective rate, while retents, i.e. insoluble solid remnants remain in the reservoir. The thickness of the porous wall preferably ranges from 0.10 to 10 mm, and most preferably from 1.0 mm to 5.0 mm.

Numerous contaminaht-reducing agents including microbial agents are useful in embodiments of the present invention for control of both organic and inorganic contaminants in aquatic or terrestrial environments, provided that such agents can be delivered in a liquid-borne composition and wherein the liquid-borne composition can pass through a porous wall or surface of a dispensing element. Therefore, the porous dispensing element is fabricated from a material of a porosity chosen such that a sufficient quantity of the active liquid-borne components of a remediation composition can pass through the dispensing element while retents, i.e. all or most of any inert solid support materials and/or other solid remnants, are retained in the reservoir.

Remediation compositions useful in the present invention comprise a variety of waterborne inorganic, organic and biological components. Generally, waterborne components such as salts, micronutrients, enzymes and other such extracellular materials are present in solution, while microparticulates and biologics such as spores, cells, bacteriophages, vegetative microorganisms and the like form aqueous suspensions. Other waterborne components such as soaps, detergents, lipids, phospholipids and the like may be present in the form of stable emulsions.

Bioactive agents useful in embodiments of the invention includes, but is no way limited to, those agents described in U.S. Pat. No. 5,569,634 to Miller and U.S. Pat. Nos. 6,346,262; 6,350,451 and 5,939,086 to Levy, all of which are hereby included by reference in their entirety. Useful in certain embodiments are the proprietary blends of bacterial spores, concentrated biodegradable surfactants and biostimulating agents available as ABR™ BIOTRAK from Novozymes Biologicals, Inc., Salem, Va.

Also useful in the present invention as means to amend inorganic nutrient deficiencies or to provide carbon for wastewater treatment are various liquid or dry formulations containing carbon sources such as sugars and other saccharides or polysaccharides as well as nutrients such as ammonium salts, nitrates, phosphates, orthophosphates, trace minerals and agents providing a oxygen source. Such components are known in the art as accelerators. Blends of such accelerator components available as BI-CHEM™ ACCELERATORS from Novozymes Biologicals, Inc., Salem, Va., are particularly useful.

Careful selection of the bioactive agents utilized in embodiments of the invention allows for facile customization to address the particular needs of specific waste streams. For example, in applications involving remediation of waste streams in the various food industries, particularly useful microorganisms are those that show superior enzymatic activity against substrates such as fats, oils, greases, proteins, starches and, other carbohydrates. Therefore, in food industry related applications microorganisms known for high production of lipases, proteases, amylases, cellulases and the like would be selected. Several aerobic and anaerobic *bacillus* spores and vegetative microorganisms suitable for such food industry related applications are commercially available.

For applications involving contamination with petroleum products a particularly useful remediation component is ABR HYDROCARBON™ available from Novozymes Biologicals, Inc., Salem, Va. This product a blend of naturally occurring bacterial cultures specifically designed to degrade the light-distilled oil fractions, as well as the heavier fractions of hydrocarbons normally associated with no. 4, no. 5, and no. 6 fuel oils, crude oil and coal tar. Such bacterial cultures are selectively adapted to tolerate high contaminant concentrations.

Particularly useful in embodiments for remediation of septic systems, on site residential wastewater systems, sewage pits and the like are synergistic blends of highly specialized and selectively adapted spores and vegetative microorganisms, designed specifically to provide accelerated degradation of difficult to degrade organic compounds. A particularly useful remediation component of this type is the dry bacterial formulation available as Bl-CHEM™ SM 700 available from Novozymes Biologicals, Inc., Salem, Va.

Also useful as remediation components in preferred embodiments of the invention are viruses and bacteriophages shown to be useful in the control of bacterial pathogens in healthcare facilities, environmental systems, food processing areas and other situations where there is contamination with pathogenic bacteria. Particularly useful are the bacteriophages shown to have antimicrobial activity against dangerous foodborne pathogens such as *Listeria monocytogenes, E. coli* and *Salmonella*. Such useful bacteriophages are described in U.S. Pat. No. 6,699,701 to Sulakvelidze et al., which is herein included by reference in its entirety.

In preferred embodiments, at least one of the contaminant-reducing agents is immobilized by fixing to an appropriate immobilizing medium. Various types of immobilizing media include, but are not limited to, natural and synthetic matrices, high surface-area inert solids, and other materials containing voids and channels in which the agents can reside. Such immobilizing media are usually referred to as carriers and are useful in a variety of sizes, shapes or textures. Useful carriers may be in particulate forms such as powders, granules, pellets, briquettes and the like or may be in agglomerated or continuous forms such as fibers, extrusions, monolithic films, sheets, laminates and the like. Two or more carriers can be combined to alter or enhance the performance characteristics of a given formulation. In certain embodiments two, three or four carriers are especially suitable in this regard.

Depending upon the functional requirements of the contaminant-reducing agents used in a specific composition, the carriers can be chosen to control certain characteristics of the composition. For example, by controlling density of the carriers, compositions can made that float, sink or remain suspended in the aqueous environment within the reservoir. Also, by controlling the compositions of the carrier media it is possible to influence the hydrophobic/hydrophilic character of the overall formulation.

Examples of suitable carriers include metal oxides, silica, alumina, clays, lava, slag, diatomaceous earth, infusdorial earth, synthetic and natural zeolites, cellulosic fibers, paper, sawdust, porous plastics and the like all of which may be finely ground or have a small particle size, but can also be agglomerated into larger components with the addition of a suitable binder component. Such suitable materials are easily obtained and many commercial bioremediation preparations immobilizing media are commercially available.

Another useful method medium for immobilizing remediation agents comprise superabsorbent solid organic polymers that are well known in the art such as those described in U.S. Pat. No. 4,375,535 to Kightlinger et al. and U.S. Pat. No. 4,497,930 to Yamasaki et al. Such superabsorbent polymers can act as the primary carriers of one or more remediation agents. Suitable superabsorbent polymers include, but are not limited to, hydrophilic acrylamide and acrylate polymers which can act as matrices for the controlled release of the remediation agents. Other useful superabsorbent polymers include combinations of a polysaccharide and an organic monomer, oligomer, polymer, copolymer, terpolymer or tetrapolymer. A particularly useful superabsorbent material is the grafting product of amylopectin with acrylonitrile.

In certain preferred embodiments the carrier medium is a matrix in the form of a woven or non-woven bundle of natural or synthetic fibers forming an integral structure that acts as a self-supporting scaffold. In some of these embodiments the carrier matrix consists of a regular textile structure such as a weave or knit. In other embodiments the carrier matrix consists of a randomly arranged, irregularly intersecting and overlapping fibrous agglomerate that provides a mesh, web, batting, mat or other such lofty fibrous structure. Such scaffold structures may be comprised of filament of any of a wide variety of synthetic and natural materials including fiber-forming synthetic resins, as well as natural fibers such as cotton, wood and other cellulosic materials. Additionally, a suitable fibrous mesh, batting or mat may be composed of woven or spun-bonded fibers comprising a binder enveloping the fibers wherein the binder holds the fibers together. Additionally, any of the fibrous scaffolds described above may further incorporate other carrier media in particulate forms such as powders, granules, pellets, and the like.

An embodiment of an apparatus of the present invention utilizing a fibrous batting as an immobilizing medium is, depicted in FIG. 8. FIG. 8 illustrates a frontal partially exploded view of a delivery apparatus 51 comprising a transparent, flexible pouch reservoir 52 and a porous closed-end dispensing element 54 wherein the pouch reservoir 52 contains a fibrous mesh 53 which acts as a scaffold to immobilize remediation components. When the apparatus 51 is fully assembled the porous closed-end dispensing element 54 is essentially embedded in, and therefore surrounded by, the fibrous mesh 53.

Figures 16, 17:
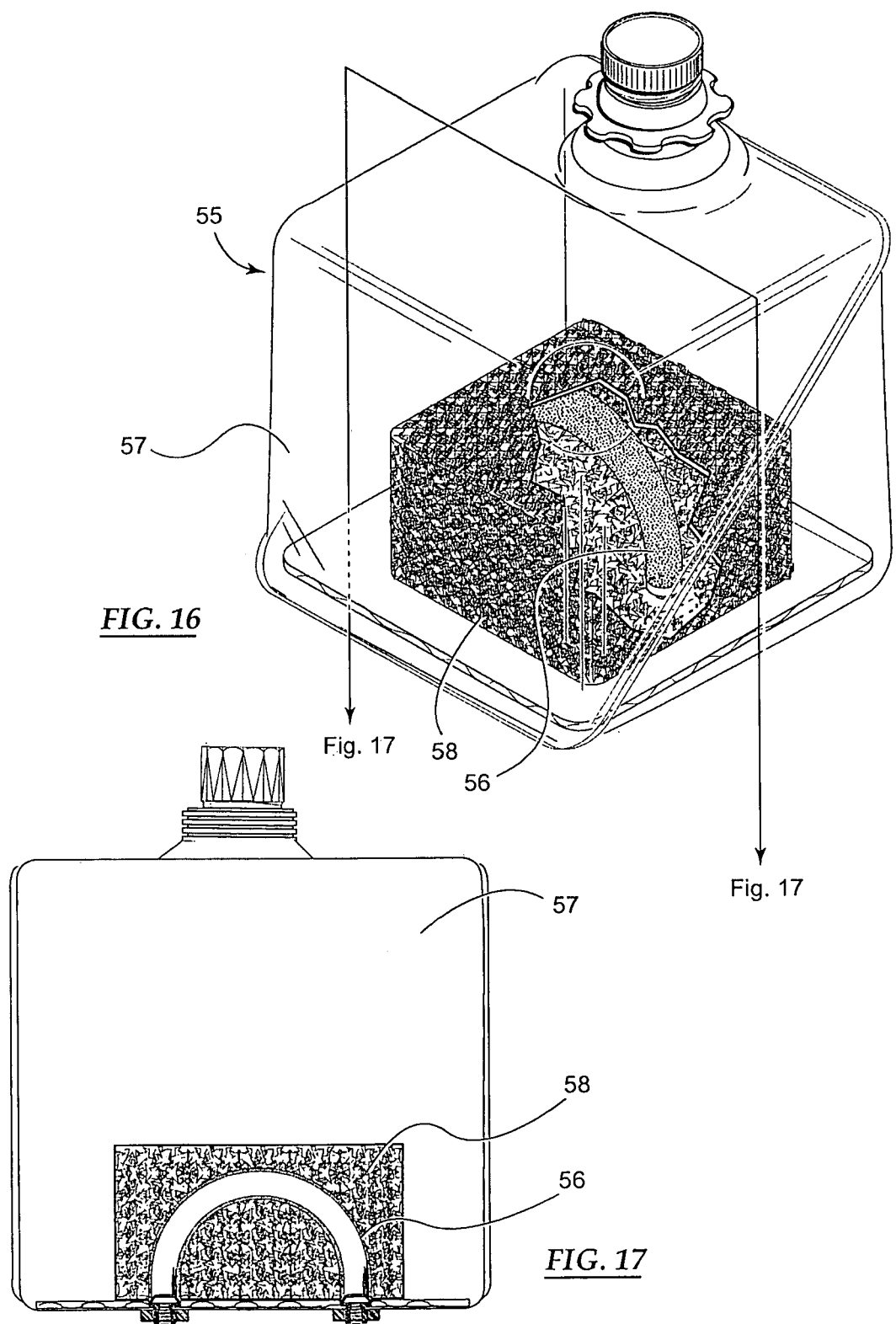
FIG. 16 is perspective view of an apparatus wherein a U-form porous dispersing element is surrounded by a self-supporting fibrous web on which a remediation material is disposed.
FIG. 17 is a cross-sectional view of the apparatus of FIG. 16 wherein a U-form porous dispersing element is surrounded by a self-supporting fibrous web on which a remediation material is disposed.

FIG. 16 and FIG. 17 illustrate an embodiment of the present invention utilizing a self-supporting fibrous mesh that acts as a scaffold to immobilize remediation components. FIG. 16 depicts a perspective view of a delivery apparatus 55 wherein a U-form dispensing element 56 is mounted within a transparent flexible cubic reservoir 57 and wherein this U-form porous dispersing element 56 is surrounded by, and in intimate contact with, a self-supporting fibrous mesh 58 that is used to immobilize suitable remediation components within the reservoir 57. In FIG. 17 is illustrated a cross-sectional view of the same delivery apparatus 55 shown in FIG. 16.

In certain embodiments of the invention, one or more components of the remediation composition are provided in sealed water-soluble or water-dispersible packets such as pouches, envelopes, bags and the like. Such packaging is useful for providing a method for the segregation of individual components that might otherwise interact physically, chemically or biologically in the dry state. Another function of such packets is to provide for the protection of sensitive components of remediation compositions from exposure to potentially damaging factors such as oxygen, humidity, pollutants and the like, thereby extending the shelf life of the composition. Still another function of such sealed water-soluble or water-dispersible packets is to provide a convenient method of combining pre-measured components thereby facilitating the production or modification of custom remediation formulations for specific applications. As an illustrative example, FIG. 6 depicts an embodiment of the present invention utilizing such individual packets 30. Suitable water-soluble or water-dispersible packets are conveniently fabricated from any of a variety of readily available water-sbluble polymers including, but not limited to, various grades of polyvinyl alcohol (PVA or PVOH); copolymers of polyvinyl alcohol; polymers and copolymers of acrylamide; cellulosics such as carboxymethyl cellulose (CMC), hydroxymethyl cellulose and cellulose acetate; and blends, alloys, composites thereof. These water-soluble polymers are commercially obtainable in a variety of forms including, but not limited to, films, textiles and non-woven fabrics. In use, the packets readily dissolve or disperse upon contact with water thereby releasing the remediation components therein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof.

What is claimed is:

1. An apparatus for delivery of a remediation composition into a waste stream comprising:
   a reservoir for a liquid, said reservoir comprising one or more openings;
   a dispensing element comprising a hollow cylindrical tubular body defining an interior cavity with a volume wherein the cylindrical tubular body comprises;
   one or two open ends; and
      a wall with an inner surface and an outer surface wherein at least a portion of the wall is porous and has a pore size and total pore volume that renders the wall pervious to a liquid-borne composition while impervious to solid retents;
   said dispensing element being positioned such that the porous portion of the wall is disposed within the reservoir while the dispensing element is fixedly disposed within at least one of said one or more openings in the reservoir such that a liquid-borne composition from within the reservoir can pass through the porous portion of the wall to the outside of the reservoir; and
   wherein the apparatus can be oriented such that a liquid-borne composition from within the reservoir can be dispensed by gravity into a waste stream over time.

2. The apparatus of claim 1 wherein the porous portion of the wall has a pore size of about 10 to 100 microns.

3. The apparatus of claim 1 wherein one of said one or two open ends is an open distal end and wherein the other of said one or two open ends is a closed proximal end, wherein the wall at the closed proximal end is porous and wherein the outer surface of the closed proximal end is a convex surface.

4. The apparatus of claim 3 wherein the convex surface of the closed proximal end is essentially hemispherical.

5. The apparatus of claim 3 wherein the ratio of the volume of the interior cavity to the total pore volume of the wall is at least 0.5.

6. The apparatus of claim 3 wherein a combination of geometry of the hollow cylindrical tubular body of the dispensing element and contour of the outer surface of the dispensing element render the dispensing element self-cleaning during use.

7. The apparatus of claim 3 wherein the open distal end of the dispensing element further comprises a connecting means which functions to sealably fix the dispensing element within said at least one opening and wherein said connecting means also functions to permit the attachment of a conduit to direct liquid borne compositions into the waste stream.

8. The apparatus of claim 7 wherein the connecting means is a screw thread.

9. The apparatus of claim 8 further comprising a retainer nut mated to the screw thread.

10. The apparatus of claim 1 wherein the hollow cylindrical tubular body of the dispensing element has two open ends; wherein the dispensing element is shaped in the form of an arc; and wherein the dispensing element is positioned such that the cylindrical tubular body is disposed within the reservoir and wherein each of the two open ends is fixedly disposed within at least one of said one or more openings.

11. The apparatus of claim 10 wherein the arc is essentially a 180-degree arc.

12. The apparatus of claim 11 wherein the ratio of the volume of the interior cavity to the total pore volume of the wall is at least 0.5.

13. The apparatus of claim 10 wherein a combination of geometry of the cylindrical tubular body of the dispensing element and contour of the outer surface of the dispensing element render the dispensing element self-cleaning during use.

14. The apparatus of claim 10 wherein each of the two open ends of the dispensing element further comprises a connecting means which functions to sealably fix the dispensing element within the openings and also functions to permit the attachment of conduits to direct the liquid borne composition into the waste stream.

15. The apparatus of claim 14 wherein the connecting means is a screw thread.

16. The apparatus of claim 15 further comprising a retainer nut mated to the screw thread.

17. The apparatus of claim 1 wherein the dispensing element comprises a material selected from the group consisting of metals, ceramics, glasses, polymers and combinations thereof.

18. The apparatus of claim 1 wherein the dispensing element comprises a polymer selected from the group consisting of polyolefins; ethylene/vinyl acetate copolymers; polyacrylates; polymethacrylates; fluoroplastics; polyesters; nylons; polyvinylchloride and combinations thereof.

19. The apparatus of claim 1 wherein the dispensing element comprises a polymer selected from the group consisting of natural rubbers, synthetic rubbers, thermoset elastomers, thermoplastic elastomers and combinations thereof.

20. The apparatus of claim 1 wherein the reservoir is a rigid vessel.

21. The apparatus of claim 1 wherein the reservoir is a semi-flexible, collapsible vessel.

22. The apparatus of claim 21 wherein the semi-flexible, collapsible vessel comprises a polymer selected from the group consisting of polyethylene, low-density polyethylene (LDPE), linear low-density polyethylene (LLDPE), polypropylene, ethylene-propylene copolymer, ethylene/vinyl acetate copolymer, polyvinylchloride, cellulose acetate, polyester, polyurethane, nylon and combinations thereof.

23. The apparatus of claim 21 further comprising a covering that encases said collapsible vessel, wherein the covering is provided with at least one opening to accommodate the dispensing element.

24. The apparatus of claim 23 wherein the covering comprises corrugated fiberboard.

25. The apparatus of claim 1 wherein the reservoir comprises a flexible pouch.

26. The apparatus of claim 25 wherein the flexible pouch comprises a polymer selected from the group consisting of polyethylene, high-density polyethylene (HDPE), low-density polyethylene (LDPE), linear low-density polyethylene (LLDPE), polypropylene, ethylene-propylene copolymer, ethylene/vinyl acetate copolymer, polyvinylchloride, cellulose acetate, polyester, polyurethane, nylon and combinations thereof.

27. The apparatus of claim 25 wherein the flexible pouch comprises one or more flow-limiting restrictions.

28. The apparatus of claim 27 wherein at least one of the one or more flow-limiting restrictions comprises a seam extending partially across the pouch effectively dividing the pouch into two sections while permitting fluid communication between liquids in the two sections.

29. The apparatus of claim 27 wherein the flexible pouch contains at least one solid remediation agent disposed in a space between said one or more flow-limiting restrictions and the dispensing element.

30. The apparatus of claim 25 wherein the flexible pouch comprises a means for attachment to an external support.

31. The apparatus of claim 1 wherein the reservoir contains at least one remediation agent that is at least partially soluble, dispersable or emulsifiable in water.

32. The apparatus of claim 1 wherein the reservoir contains at least one remediation agent that is bioactive or bioactivatable.

33. The apparatus of claim 1 wherein the reservoir contains at least one remediation agent comprising at least one water-soluble, water-dispersable or water-emulsifiable component disposed upon or disposed within a solid immobilizing medium.

34. The apparatus of claim 33 wherein the solid immobilizing medium comprises a fibrous web, mesh, batting or mat.

35. The apparatus of claim 1 wherein the reservoir contains at least one remediation agent comprising bacterial cultures, bacteriophages, cells, vegetative microorganisms, spores, algae, fungi, enzymes or combinations thereof.

36. The apparatus of claim 1 wherein the reservoir contains at least one remediation agent sealed within a water-dispersible or water-soluble packet.

37. The apparatus of claim 35 wherein the water-dispersible or water-soluble packet is comprised of a material selected from the group consisting of polyvinyl alcohol, polyvinyl alcohol copolymers, polyacrylamide, copolymers of acrylamide, and cellulosics.

38. A method for remediation of a waste stream comprising the steps of:
   i. providing the apparatus of claim 1;
   ii. introducing a liquid-borne remediation composition into the reservoir; and
   iii. orienting the apparatus with respect to a waste stream such that the liquid-borne remediation composition from with the reservoir is continuously delivered through the dispensing element to the waste stream over time.

39. The method of claim 38 wherein the liquid-borne remediation composition is a waterborne remediation composition.

40. A method for remediation of a waste stream comprising the steps of:
   i. providing the apparatus of claim 1 wherein the reservoir contains one or more water-soluble, water-dispersable or water-emulsifiable remediation agents in dry form selected from the group consisting of vegetative microorganisms, spores, cells, bacterial cultures, bacteriophages, algae, fungi, enzymes, nutrients, micronutrients, buffer salts, activators, soaps, detergents, lipids, carbohydrates, or combinations thereof;
   ii. introducing into the reservoir one or more aqueous compositions selected from the group consisting of water, buffer solutions, activator compositions, nutrient compositions, surfactants, bio-stimulating compositions and oxygen producing compositions;
   iii. maintaining the contents of the reservoir for a period of time sufficient to generate, release, solubilize, disperse, emulsify, activate or propagate components of said one or more remediation agents to afford an effective waterborne remediation composition; and
   iv. orienting the apparatus with respect to a waste stream such that the waterborne remediation composition from with the reservoir is continuously delivered through the dispensing element to the waste stream over time.

* * * * *